(12) United States Patent
Saito et al.

(10) Patent No.: US 6,466,377 B1
(45) Date of Patent: Oct. 15, 2002

(54) IMAGE PICKUP LENS SYSTEM

(75) Inventors: Tomohiro Saito; Isamu Kaneko, both of Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/656,401

(22) Filed: Sep. 6, 2000

(30) Foreign Application Priority Data

Sep. 6, 1999 (JP) .......................................... 11-252035

(51) Int. Cl.⁷ ........................ G02B 21/02; G02B 13/18; G02B 9/14
(52) U.S. Cl. ....................... 359/661; 359/716; 359/785; 359/790
(58) Field of Search ................................ 359/716, 661, 359/785, 790

(56) References Cited

U.S. PATENT DOCUMENTS

| | | | | |
|---|---|---|---|---|
| 4,139,266 A | * | 2/1979 | Koizumi | 359/661 |
| 4,139,267 A | * | 2/1979 | Minoura | 359/661 |
| 4,531,815 A | * | 7/1985 | Konno et al. | 359/661 |
| 4,556,296 A | * | 12/1985 | Sugiyama | 359/661 |

\* cited by examiner

Primary Examiner—Scott J. Sugarman
(74) Attorney, Agent, or Firm—Koda & Androlia

(57) ABSTRACT

An image pickup lens system according to the present invention includes a diaphragm, a first lens which has a convex fact formed on the side of an image surface in the vicinity of an optical axis and which has a positive power and radii of curvature at a center, whose signs are not opposite from each other, a second lens which has a convex face formed on the side of an object in the vicinity of the optical axis and which has a negative power and radii of curvature at a center, whose signs are not opposite from each other, and a third lens which has a convex face formed on the side of the image surface in the vicinity of the optical axis and which has a positive power. The diaphragm and the first, second and third lenses are disposed sequentially from the side of the object, and the first face of at least the second lens being formed into an aspherical shape. Thus, each of various aberrations can be corrected satisfactorily, while maintaining a desired optical performance and ensuring a wider angle of view, and the image pickup lens system can be produced easily.

4 Claims, 15 Drawing Sheets

IMAGE PICKUP LENS SYSTEM

BACKGROUND OF THE INVENTION

1. Field of the Invention

The present invention relates to an image pickup lens system and particularly, to an image pickup lens system which is comprised of three lenses and used in an image pick-up device (e.g., an image-inputting CCD camera) utilizing a solid image-pickup element such as CCD, CMOS and the like mounted on a potable computer, a visual telephone and the like, and which can be reduced in size and weight.

2. Description of the Related Art

In recent years, multimedia have been developed remarkably, and for example, the demand for a camera utilizing a solid image-pickup element such as CCD, CMOS and like, e.g., a CCD camera, mounted on a portable computer, a visual telephone and the like, is being increased remarkably. Such a CCD camera is required to be mounted in a limited space and for this reason, it is desired that the CCD camera is small in size and lightweight. Therefore, it is also desired that an image pickup lens system used in such a CCD camera is likewise small in size and lightweight.

A one-lens system using a single lens or a two-lens system using two lenses is conventionally used as such an image pickup lens system.

However, such a lens system is convenient extremely for reducing the size and weight of the lens, but recently suffers from a problem that it is not suitable for increasing the picture quality and the resolution required for the image pick-up lens system.

For this reason, it is a conventional practice to use a three-lens system using three lenses, thereby providing increases in picture quality and in resolution.

Such a three-lens system has a long history in the field of a silver-salt photograph camera, and optical lens systems of various arrangements have been developed.

In the lens system in the silver-salt photograph camera, however, if the lens is used in a configuration as it is, the lens is difficult to produce, because of the relationship between the lens thickness and the focal length and the relationship between the lens thickness and the lens diameter. For this reason, it is impossible to utilize the lens as an image pickup lens for an image pickup element.

Therefore, a three-lens image pickup lens system exclusively used in an image pickup element has been conventionally developed. One example of such image pickup lens system is a lens system comprising a lens having a negative power, a lens having a negative power and a lens having a positive power, which are arranged sequentially from the side of the object.

However, the conventional image pickup lens system of such arrangement suffers from the following problems: Various aberrations including mainly a chromic aberration cannot be corrected appropriately, and it is difficult to ensure a large distance from an image surface to an exit pupil.

To solve such problems, it is effective to provide a diaphragm at a location closer to an object from an optical system (a group of lenses). Such image pickup lens systems include those disclosed, for example, in Japanese Patent Application Laid-open Nos. 4-153612, 5-188284 and 9-288235.

Any of these image pickup lens systems disclosed in the above Patent Applications is comprised of a diaphragm, a first lens, a second lens and a third lens, which are disposed sequentially from the side of an object. The first lens is a lens which has a first face formed as a convex face and has a positive power; the second lens is a lens which has a first face formed as a concave face and has a negative power; and the third lens is a lens having a positive power.

However, any of such conventional image pickup lens systems suffers from a problem that a larger angle of view of the image pickup lens cannot be ensured, and the maximum limit of angle of view capable of being ensured is about 50°, because the first face of the first lens is formed into the convex face.

Any of the conventional image pickup lens systems disclosed in the above Patent Applications suffers from a problem that a special glass material having a high refractive index on the order of 1.7 or a super-high refractive index of 1.8 or more is used for producing the lens and for this reason, a reduction in weight of the lens system cannot be achieved and moreover, the manufacture cost is increased. A further problem encountered in each of the conventional image pickup lens systems disclosed in the above Patent Applications is that when an inexpensive glass or resin material such as a plastic is used to provide reductions in weight and cost, it is impossible to ensure a desired optical performance of each of the lenses.

SUMMARY OF THE INVENTION

Accordingly, it is an object of the present invention to provide an image pickup lens system, in which an inexpensive glass or plastic material is used for producing each of lenses, but still, various aberrations can be corrected satisfactorily, while maintaining a desired optical performance and ensuring a wider angle of view, and which can be produced easily.

To achieve the above object, according to the present invention, there is provided an image pickup lens system comprising a diaphragm, a first lens which has a convex face formed on the side of an image surface in the vicinity of an optical axis and which has a positive power and radii of curvature at a center, whose signs are not opposite from each other, a second lens which has a convex face formed on the side of an object in the vicinity of the optical axis and which has a negative power and radii of curvature at a center, whose signs are not opposite from each other, and a third lens which has a convex face formed on the side of the image surface in the vicinity of the optical axis and which has a positive power, said diaphragm and said first, second and third lenses being disposed sequentially from the side of the object, the first face of at least said second lens being formed into an aspherical shape.

With the above feature, the second face of the first lens adjacent the image surface is the convex face, and the first face of the fist lens adjacent the object is not opposite in sign from the second face and hence, the first face of the first lens may be a concave or flat face. Thus, a wider angle of view can be ensured.

According to the present invention, the first lens satisfies the following expression:

$$r_1 \leq 1.5 \times r_2$$

wherein $r_1$ is a radius of curvature at the center of the first face of the first lens adjacent the object, and $r_2$ is a radius of curvature at the center of the second face of the first lens adjacent the image surface.

With the above feature, the above expression is a condition for ensuring that various aberrations can be corrected satisfactorily, while ensuring a desired optical performance and maintaining a wider angle of view, and the image pickup lens system can be produced easily. By setting the value of $r_1$ in the expression at a value equal to or smaller than $1.5 \times r_2$, each of various aberrations, particularly, a distortion, can be suppressed to an acceptable level, while ensuring a wider angle of view. Further, by setting the value of $r_1$ in the expression at a value equal to or smaller than $1.7 \times r_2$, the generation of the aberrations can be inhibited.

According to the present invention, the second lens satisfies the following expression:

$$0.45 \times r_3 \geq r_4$$

wherein $r_3$ is a radius of curvature at the center of the first face of the second lens adjacent the object, and $r_4$ is a radius of curvature at the center of the second face of the second lens adjacent the image surface.

With the above feature, the above expression is a condition for ensuring that each of various aberrations can be corrected satisfactorily, while maintaining a desired optical performance and a wider angle of view, and the image pickup lens system can be produced easily. By setting the value of $r_4$ in the expression at a value equal to or smaller than $0.45 \times r_3$, each of the aberrations such as a magnification chromic aberration can be corrected satisfactorily.

DESCRIPTION OF THE PREFERRED EMBODIMENTS

The present invention will now be described by way of an embodiment with reference to FIGS. 1 to 15.

Figure 1:
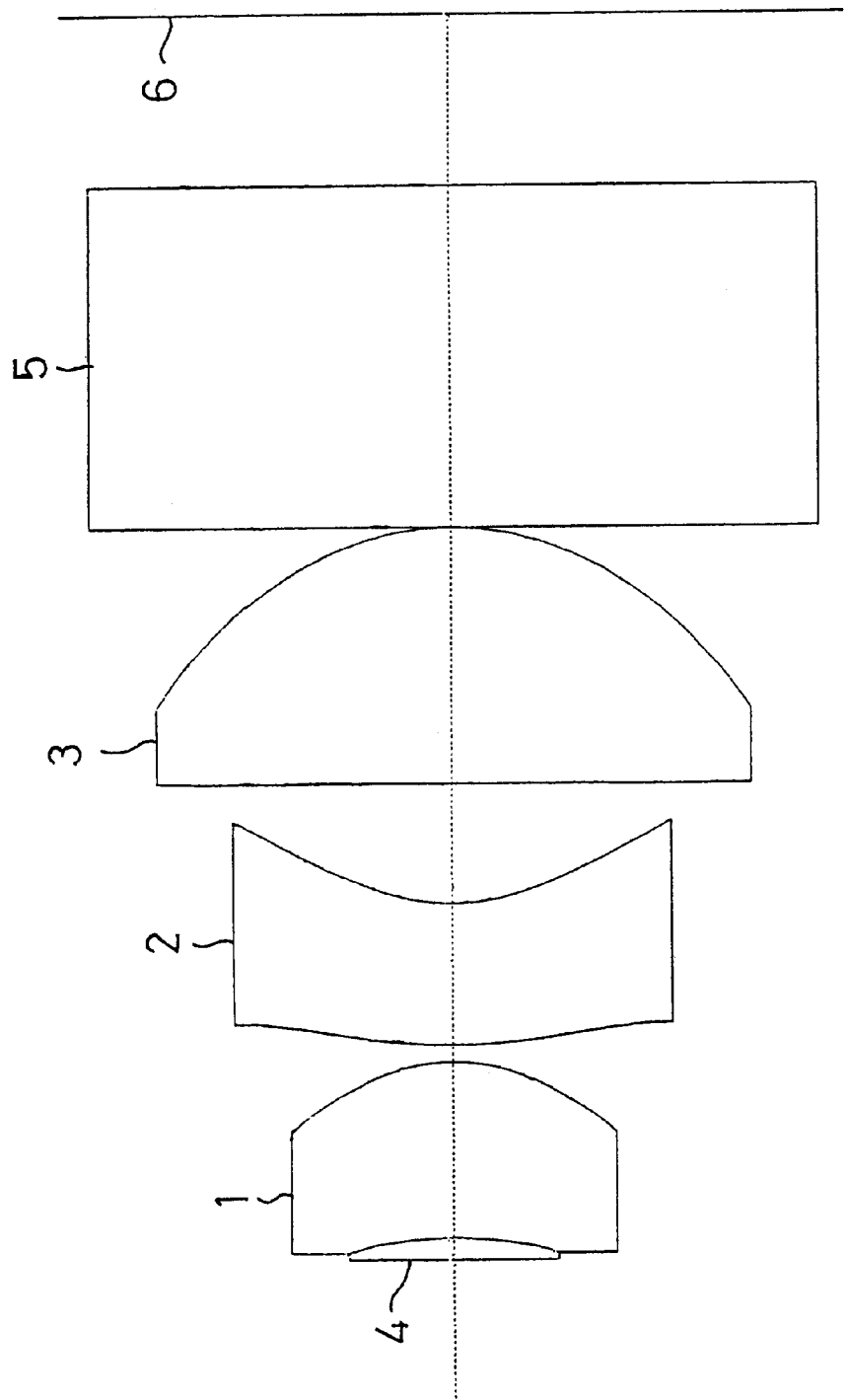
FIG. 1 is a schematic illustration of an arrangement of an embodiment of an image pickup lens system according to the present invention.

FIG. 1 shows a basic arrangement of an image pickup lens system according to the present invention. The image pickup lens system of the present embodiment comprises a first lens 1 which includes a convex face formed on the side of an image surface in the vicinity of an optical axis and has radii of curvature at its center, whose signs are not opposite from each other, and a positive power, a second lens 2 which includes a convex face formed on the side of an object in the vicinity of an optical axis and has radii of curvature at its center, whose signs are not opposite from each other, and a negative power, and a third lens 3 which includes a convex face formed on the side of the image surface in the vicinity of an optical axis and has radii of curvature at its center, whose signs are not opposite from each other, and a positive power. Among the first, second and third lenses, a fist face of at least the second lens located adjacent the object is formed into an aspherical shape.

Further, a diaphragm 4 is disposed at a location on the side of the first lens 1 adjacent the object, and a cover glass 5 and a CCD as an image pickup element are mounted on a second face of the third lens 3. Reference character 6 designates an image pickup surface of the CCD.

The cover glass 5 is used for protection of the image pickup surface or the like, but is necessarily not required in the present invention and may be selectively disposed or not disposed depending on the application of the image pickup lens system. In place of the cover glass 5 or in addition to the cover glass 5, a low-pass filter or the like may be disposed.

The first and second lenses 1 and 2 satisfy the following conditions:

$$r_1 \leq 1.5 \times r_2, \text{ preferably, } r_1 \leq 1.5 \times r_2 \quad (1)$$

$$0.45 \times r_3 \geq r_4, \text{ preferably, } 0.45 \times r_3 \geq r_4 \geq 0.2 f1 \quad (2)$$

wherein $r_1$ is a radius of curvature at the center of the first face of the first lens 1 adjacent the object; $r_2$ is a radius of curvature at the center of the second face of the first lens 1 adjacent the image surface; $r_3$ is a radius of curvature at the center of the first face of the second lens 2 adjacent the object; $r_4$ is a radius of curvature at the center of the second face of the second lens 2 adjacent the image surface; and f1 is a focal length of the entire optical system.

In the present embodiment, the expressions (1) and (2) are conditions for ensuring that each of various aberrations can be corrected satisfactorily, while maintaining a desired optical performance and ensuring a wider angle of view, and the image pickup lens system can be produced easily.

In the present embodiment, the second face of the first lens 1 adjacent the image surface is a convex face, and the first face of the first lens adjacent the object is not opposite in sign from the second face and hence, the first face of the first face of the first lens 1 may be a concave or a flat face. Thus, The expression (1) is satisfied, and a wider angle of view can be ensured. By setting the value of $r_1$ in the expression (1) at a value equal to or smaller than $1.5 \times r_2$, each of various aberrations, particularly, a distortion, can be suppressed to an acceptable level. Further, by setting the value of $r_1$ at a value equal to or smaller than $1.7 \times_2$, the generation of the aberrations can be inhibited.

In addition, by setting the value of $r_4$ in the expression (2) at a value equal to or smaller than $0.45 \times r_3$, each of aberrations such as a magnification chromic aberration or the like can be corrected satisfactorily. Further, if the value of $r_4$ is smaller than 0.2 f1, the radius of curvature of the second face of the second lens is too small and as a result, the second lens is difficult to produce.

The second face of the third lens adjacent the image surface is the convex face, but the first face of the third lens adjacent the object may be any of a convex face, a concave face and a flat face.

In the present embodiment, each of the lenses 1, 2 and 3 is formed of a resin such as a plastic or the like, but the third lens 3 may be formed from a usual glass material.

In the present embodiment, the lenses 1, 2 and 3 and the diaphragm 4 are positioned at locations such that the following conditions are satisfied:

$$f1 \geq D_i 0.1 \times f1 \quad (3)$$

$$D_s \leq 0.6 \times f1 \quad (4)$$

$$D_0 \leq 0.1 \times f1 \quad (5)$$

wherein f1 is a focal length of the entire optical system; $D_i$ is a thickness of the center of the first lens; $D_s$ is a distance from the position of a front focus to the diaphragm 4; and $D_0$ is a distance from the diaphragm 4 to the first face of the first lens 1.

In the present embodiment, the expressions (3), (4) and (5) are conditions for ensuring that a reduction in size of the entire optical system can be achieved, while ensuring a distance from the image surface from an exit pupil, and the image-pickup lens system car be produced easily.

If the value of $D_i$ in the expression (3) is larger than f1, when the lens is formed from a resin by an injection molding process, the shrinkage of the resin is increased and hence, it is difficult to process the produced lens to a desired shape, and the manufacture cost is also increased. If the value of $D_i$ is smaller than $0.1 \times f1$, it is extremely difficult to produce the lens, and the manufacture cost is likewise increased. If the value of $D_i$ is smaller than $0.1 \times f1$, it is extremely difficult to produce the lens, and the manufacture cost is likewise increased.

In general, the position of the exit pupil is determined by the relationship between the position of the front focus of the lens disposed at a location adjacent the image surface from the diaphragm 4 and the position of the diaphragm 4. In the optical system according to the present invention, all of the lenses exist at locations adjacent the image surface from the diaphragm 4 and hence, the position of the injecting pupil is determined by the relationship between the positions of front foci of all the lenses and the position of the diaphragm 4. In an optical system for a solid image-pickup element, it is desirable to ensure a longer distance from the image surface to the position of the exit pupil. However, if the $D_s$ in the expression (4) s larger than $0.6 \times f1$, the distance from the image surface to the position of the exit pupil is too short and not suitable for the optical system for the solid image pickup element.

Further, if the value of $D_0$ in the expression (5) is larger than $0.1 \times f1$, the distance from the diaphragm 4 to the third lens 3 is increased, and the effective diameter of the third lens 3 is increased, resulting in an increase in size of the entire optical system. Additionally, it is difficult not only to form the shape of the second face of the second lens 2 adjacent the image surface, but also to correct the off-axial aberrations.

In the present embodiment, the satisfaction of the expressions ensures that each of the aberrations can be corrected satisfactorily, while maintaining a desired optical performance and ensuring a wider angle of view; a reduction in size of the entire optical system can be achieved, while ensuring the distance from the image surface to the exit pupil, and the image pickup lens system can be produced easily.

The optical system in the present embodiment is extremely suitable for a wide-angle optical system having a diagonal length of an image surface equal to or smaller than 10 mm and a diagonal angle of view equal to or larger than 50°.

EXAMPLES

Examples of the present invention will now be described with reference to FIGS. 2 to 15.

In Examples described below, f1 is a focal length of the entire optical system; $f_1$ is a focal length of the first lens 1; $f_2$ is a focal length of the second lens 2; $f_3$ is a focal length of the third lens 3; $f_{12}$ is a composite focal length of the first and second lenses 1 and 2; F is an F number; 2ω is a diagonal angle of view; r is a radius of curvature of the lens or the like; d is a lens thickness or an air gap; and is a refractive index; and vd is an Abbe number.

If the a Z-axis is taken in a direction of an optical axis; an X-axis is taken in a direction perpendicular to the optical axis; and the direction of travel of light is defined to be positive, the aspherical shape of the lens is represented by the standard aspherical expression;

Wherein each of k, a, b, c and d is an aspherical factor.

Example 1

Figure 2:
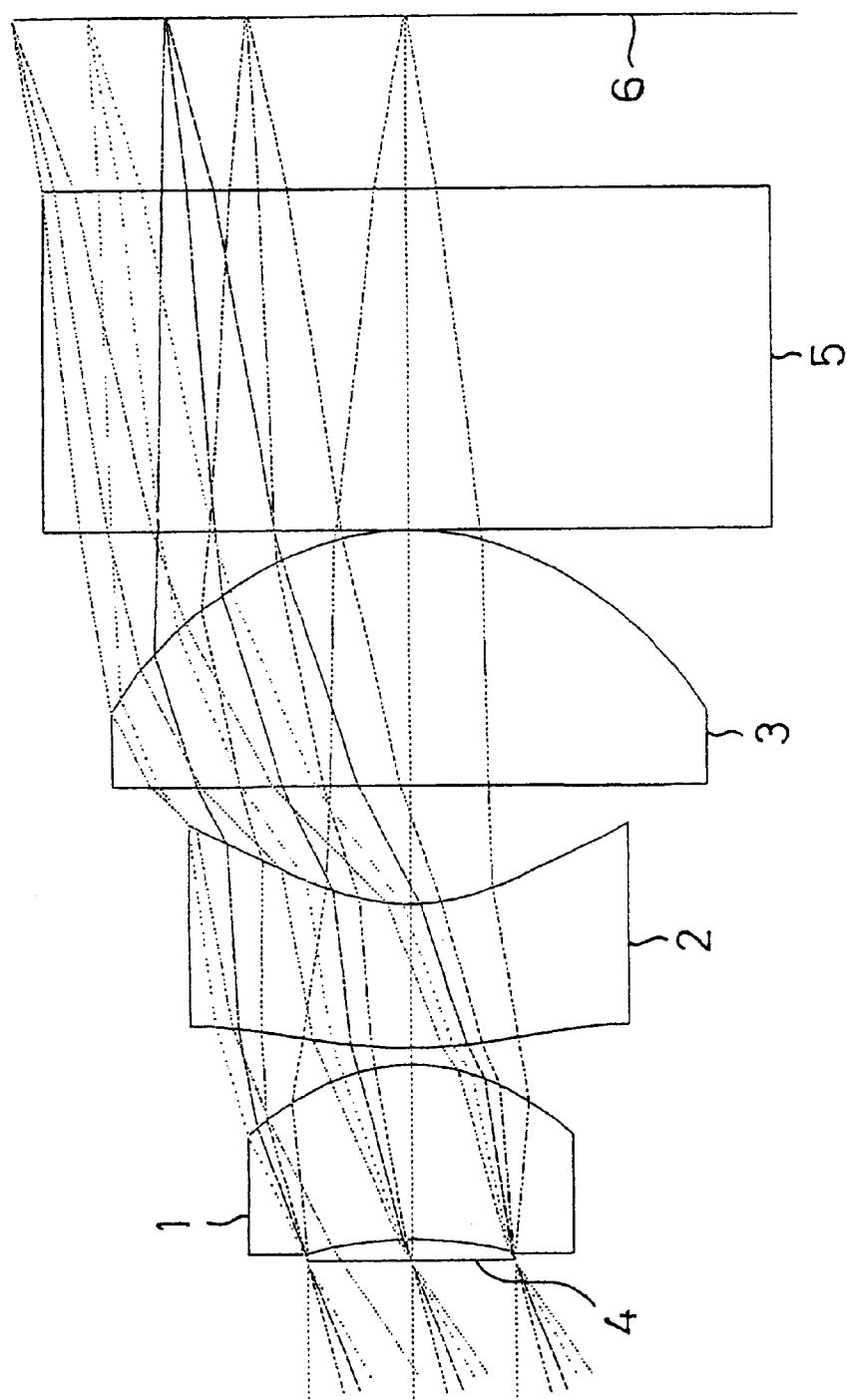
FIG. 2 is a schematic illustration showing Example 1 of an image pickup lens system according to the present invention.

FIG. 2 show is Example 1 of the present invention, which is an image pickup lens system having the arrangement shown in FIG. 1. The image pickup lens system of Example 1 is set under the following conditions:

f1=3.34 mm; F=2.80; 2ω=68.0°; $f_1$=3.00 mm; $f_2$=−2.97 mm; $f_3$=3.02 mm; $f_{12}$=14.56 mm

| Face | Radius r of curvature | Distance d | Refractive index nd | Abbe number vd |
|---|---|---|---|---|
| (1) Diaphragm | 0.000 | 0.1200 | | |
| (2) First face of first lens | −2.586 | 1.0000 | 1.49 | 57.8 |
| (3) Second face of first lens | −1.063 | 0.1000 | | |
| (4) First face of second lens | 2.784 | 0.8000 | 1.62 | 24.0 |
| (5) Second face of second lens | −2.050 | 0.0000 | | |
| (6) First face of third lens | 57.174 | 1.4600 | 1.52 | 53.0 |
| (7) Second face of third lens | −1.609 | 0.0000 | | |
| (8) First face of cover glass | 0.000 | 1.9500 | 1.52 | |
| (9) Second face of cover glass | 0.000 | 1.0174 | | |
| (10) CCD face | | | | |

-continued

| | k | A | b |
|---|---|---|---|
| 2 | 6.810868e+000 | −2.357894e−002 | 1.624164e−001 |
| 3 | −2.232929e+000 | −7.375819e−002 | −1.456437e−002 |
| 4 | −1.833163e+001 | −8.670305e−003 | −9.173228e−003 |
| 5 | −3.864276e+000 | 1.570408e−003 | −2.351872e−003 |
| 6 | 3.151462e+002 | −1.965893e−002 | 8.676285e−003 |
| 7 | −6.173778e−001 | 3.328384e−003 | 3.281874e−004 |

| | C | d |
|---|---|---|
| 2 | 2.510014e−001 | 0.000000e+000 |
| 3 | 1.339581e−003 | 0.000000e+000 |
| 4 | 1.521292e−003 | 0.000000e+000 |
| 5 | 1.878650e−004 | 0.000000e+000 |
| 6 | −7.239345e−004 | −5.084691e−006 |
| 7 | −3.825583e−004 | −9.683090e−005 |

Under such conditions, $r_1/r_2 = 2.433$ was established, thereby satisfying the expression (1).

In addition, $r_4/r_3 = 0.355$ was established, thereby satisfying the expression (2).

Further, the thickness $D_1$ of the first lens 1 was 1.0000 mm; the thickness $D_2$ of the second lens 2 was 0.8000 mm; the thickness $D_3$ of the third lens 3 was 1.4600 mm, each of which satisfied the expression (3).

In addition, $D_s = 0.560$ was established, thereby satisfying the expression (4).

Further, $D_0 = 0.12$ was established, thereby satisfying the expression (5).

Figure 3:
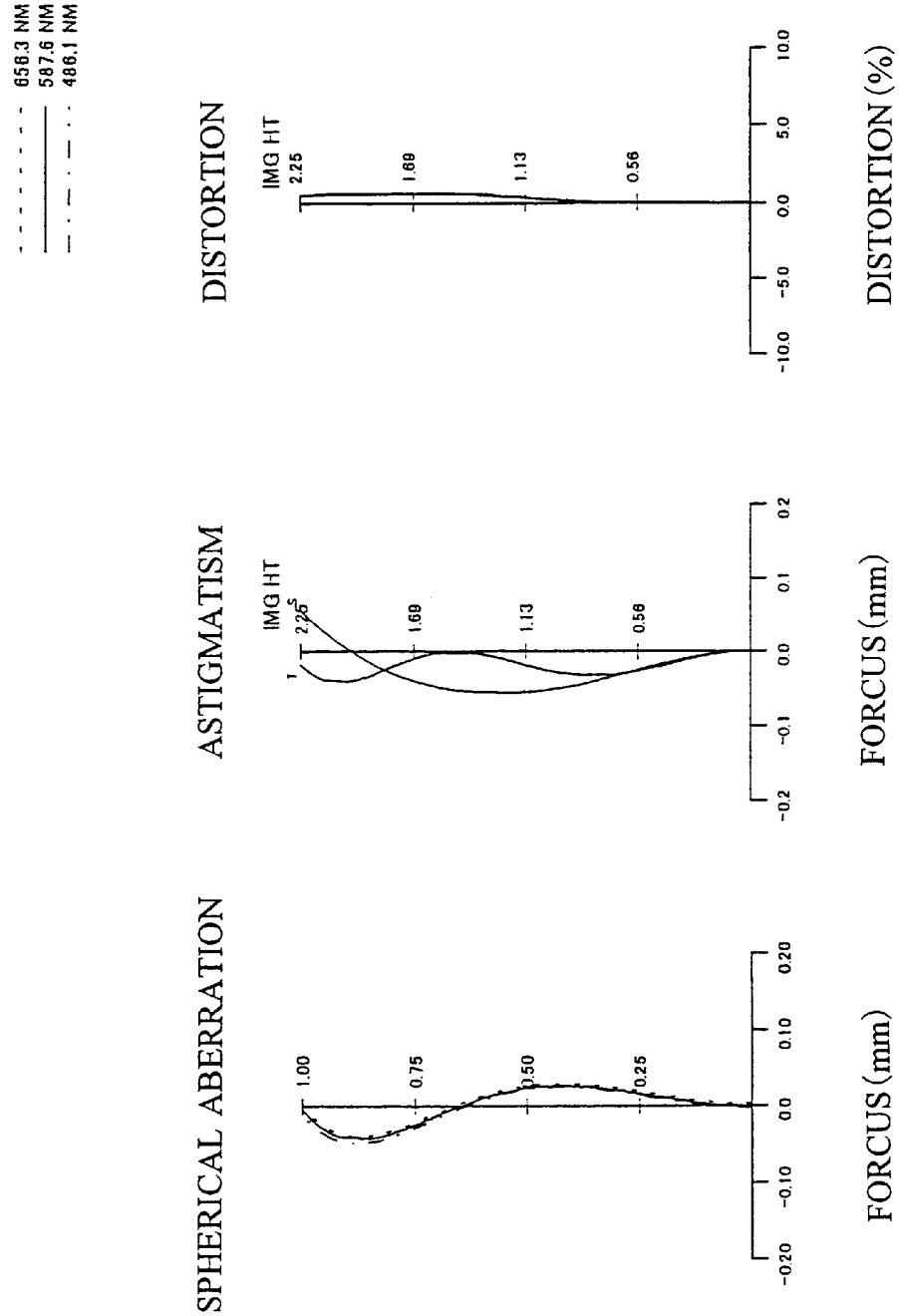
FIG. 3 is graphs showing the spherical aberration, the astigmatism and the distortion of the image pickup lens system shown in FIG. 2.

The spherical aberration, the astigmatism and the distortion in the image pickup lens system of Example 1 are shown in FIG. 3.

It can be seen from this result that any of the spherical aberration, the astigmatism and the distortion assumes a satisfactory value and hence, sufficient optical characteristics can be provided.

Example 2

Figure 4:
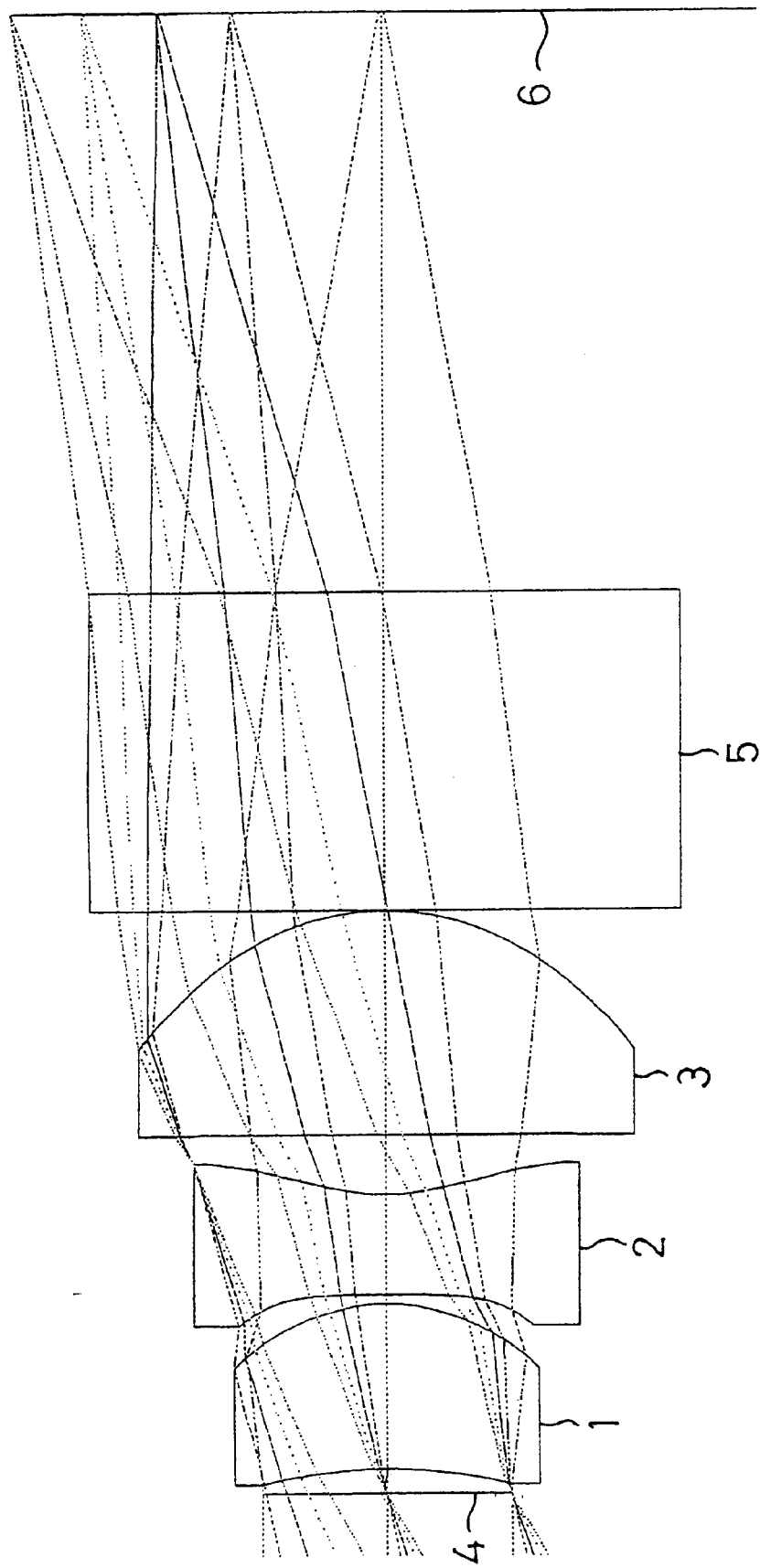
FIG. 4 is a schematic illustration showing Example 2 of an image pickup lens system according to the present invention.

FIG. 4 shows Example 2 of the present invention, which is an image pickup lens system having the arrangement shown in FIG. 1. The image pickup lens system of Example 2 is set under the following conditions:

f1=4.21 mm; F=2.80; 2ω=58.8°; $f_1$=3.22 mm; $f_2$=−2.24 mm; $f_3$=3.12 mm; $f_{12}$=−8.04 mm

| Face | Radius r of curvature | Distance d | Refractive index nd | Abbe number vd |
|---|---|---|---|---|
| (1) Diaphragm | 0.000 | 0.1500 | | |
| (2) First face of first lens | −2.979 | 1.0000 | 1.49 | 57.8 |
| (3) Second face of first lens | −1.153 | 0.0500 | | |
| (4) First face of second lens | 65.072 | 0.6000 | 1.58 | 30.0 |
| (5) Second face of second lens | 1.283 | 0.3500 | | |
| (6) First face of third lens | −72.181 | 1.3500 | 1.49 | 57.8 |
| (7) Second face of third lens | −1.521 | 0.0000 | | |
| (8) First face of cover glass | 0.000 | 1.9500 | 1.52 | |

-continued

| | | | |
|---|---|---|---|
| (9) Second face of cover glass | 0.000 | 3.4930 | |
| (10) CCD face | | | |

| | K | A | b |
|---|---|---|---|
| 2 | 1.171866e+001 | 1.225985e−001 | −1.447614e−001 |
| 3 | −3.436575e+000 | −1.147218e−001 | −2.605932e−002 |
| 4 | −2.584875e+005 | −2.444967e−001 | −1.057055e−001 |
| 5 | −5.990517e+000 | −1.093009e−001 | 3.616028e−002 |
| 6 | 4.620498e+002 | 1.652295e−002 | −2.025125e−002 |
| 7 | −6.312580e−001 | −7.274025e−003 | 1.580740e−003 |

| | C | d |
|---|---|---|
| 2 | 2.211246e−001 | 6.438260e−003 |
| 3 | 1.055872e−002 | −3.245510e−002 |
| 4 | 1.572570e−001 | −1.616840e−001 |
| 5 | −3.995775e−003 | −2.963840e−003 |
| 6 | 1.341412e−002 | −3.735690e−003 |
| 7 | −3.912459e−003 | 1.483400e−003 |

Under such conditions, $r_1/r_2 = 2.584$ was established, thereby satisfying the expression (1).

In addition, $r_4/r_3 = 0.020$ was established, thereby the expression (2).

Further, the thickness $D_1$ of the first lens 1 was 1.0000 mm; the thickness $D_2$ of the second lens 2 was 0.6000 mm; the thickness $D_3$ of the third lens 3 was 1.3500 mm, each of which satisfied the expression (3).

In addition, $D_s = 1.417$ was established, thereby satisfying the expression (4).

Further, $D_0 = 0.15$ was established, thereby satisfying the expression (5).

Figure 5:
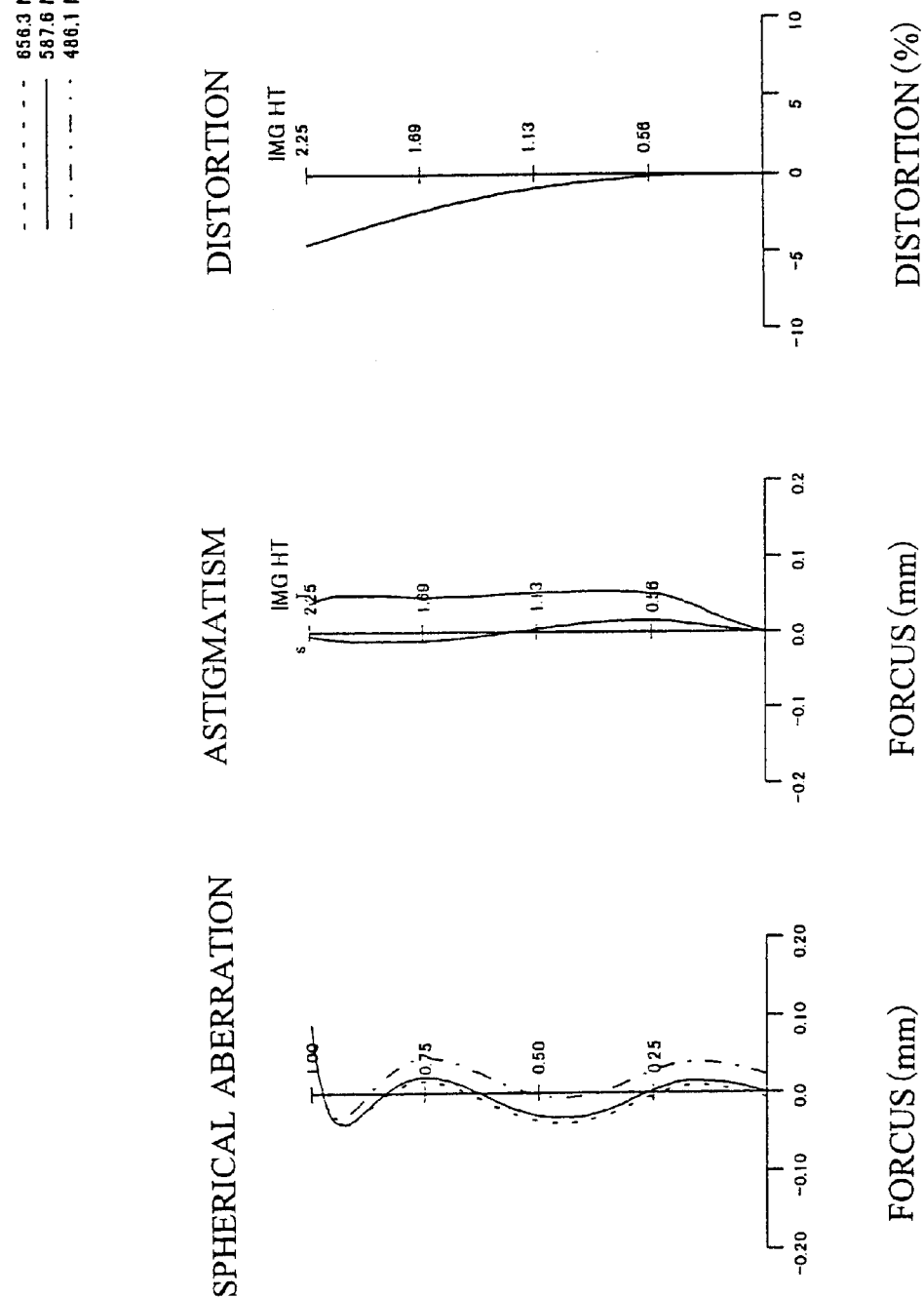
FIG. 5 is graphs showing the spherical aberration, the astigmatism and the distortion of the image pickup lens system shown in FIG. 4.

The spherical aberration, the astigmatism and the distortion in the image pickup lens system of Example 2 are shown in FIG. 5.

It can be seen from this result that any of the spherical aberration, the astigmatism and the distortion assumes a satisfactory value and hence, sufficient optical characteristics can be provided.

Example 3

Figure 6:
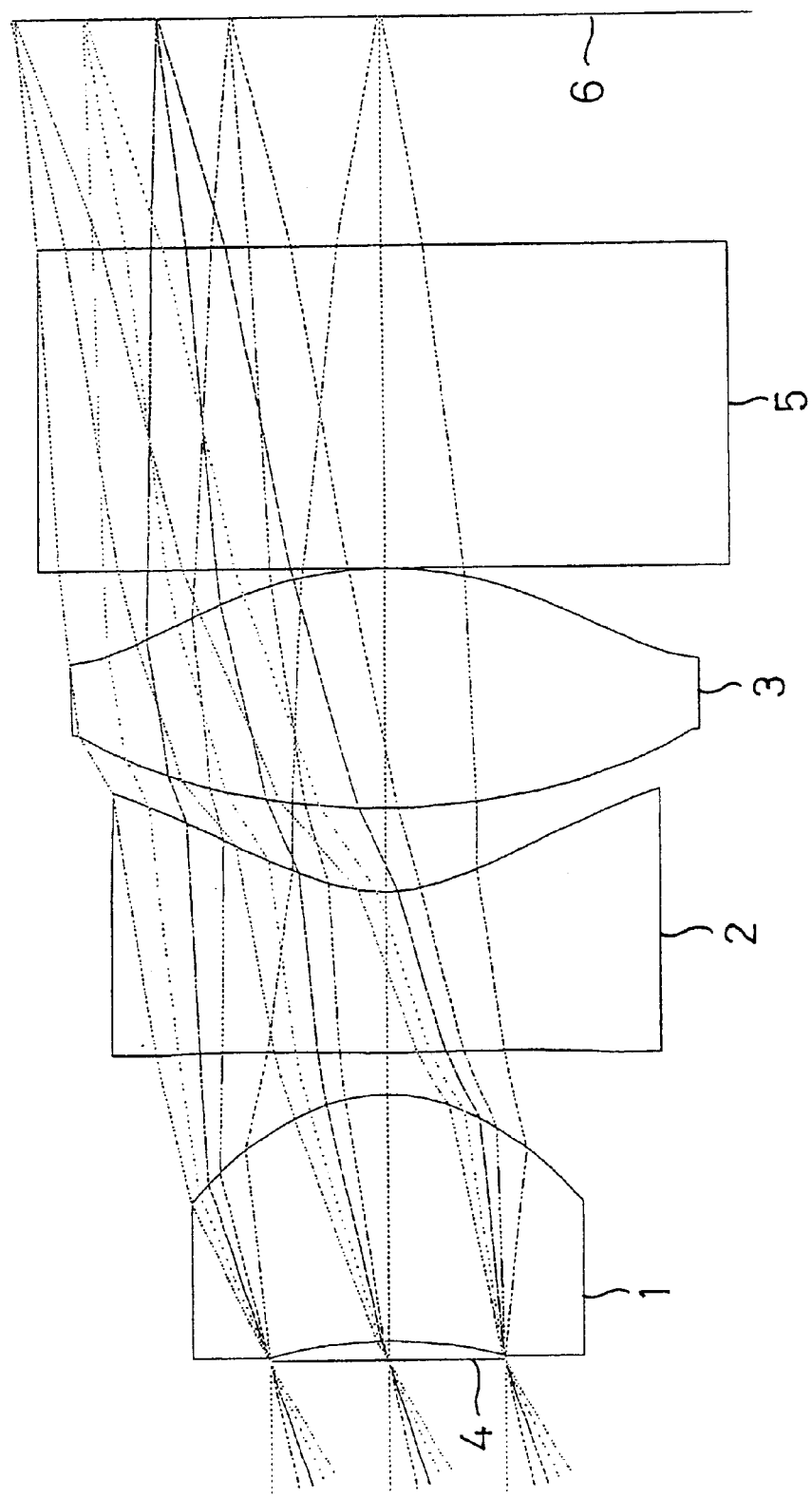
FIG. 6 is a schematic illustration showing Example 3 of an image pickup lens system according to the present invention.

FIG. 6 shows Example 3 of the present invention, which is an image pickup lens system having the arrangement shown in FIG. 1. The image pickup lens system of Example 3 is set under the following conditions:

f1=4.00 mm; F=2.80; 2ω=60.1°; $f_1$=2.37 mm; $f_2$=−1.85 mm; $f_3$=3.13 mm; $f_{12}$=152.60 mm

| Face | Radius r of curvature | Distance d | Refractive index nd | Abbe number vd |
|---|---|---|---|---|
| (1) Diaphragm | 0.000 | 0.1200 | | |
| (2) First face of first lens | −3.211 | 1.4696 | 1.49 | 57.8 |
| (3) Second face of first lens | −0.988 | 0.2415 | | |
| (4) First face of second lens | 16.263 | 0.9660 | 1.58 | 30.0 |
| (5) Second face of second lens | 0.993 | 0.5000 | | |
| (6) First face of third lens | 3.781 | 1.4600 | 1.49 | 57.8 |
| (7) Second face of third lens | −2.282 | 0.0000 | | |

-continued

| | | | |
|---|---|---|---|
| (8) First face of cover glass | 0.000 | 1.9500 | 1.52 |
| (9) Second face of cover glass | 0.000 | 1.3624 | |
| (10) CCD face | | | |

| | K | A | B |
|---|---|---|---|
| 2 | 5.929735e+000 | −2.859071e−002 | 1.046176e−002 |
| 3 | −2.360030e+000 | −4.431520e−002 | −2.603456e−002 |
| 4 | −1.538654e+001 | −1.413687e−002 | −8.950297e−003 |
| 5 | −3.993883e+000 | −1.153873e−002 | 8.889962e−003 |
| 6 | 0.000000e+000 | −4.418279e−002 | 3.261525e−002 |
| 7 | −5.831106e−001 | 9.874002e−003 | −7.137743e−003 |

| | C | D |
|---|---|---|
| 2 | −9.219272e−002 | 6.782276e−002 |
| 3 | 1.730786e−002 | −6.694795e−003 |
| 4 | 4.501324e−003 | −4.155513e−004 |
| 5 | −5.586444e−003 | 9.309323e−004 |
| 6 | −9.287161e−003 | 9.445557e−004 |
| 7 | 5.355318e−003 | −6.681037e−004 |

Under such conditions, $r_1/r_2 = 3.250$ was established, thereby satisfying the expression (1).

In addition, $r_4/r_3 = 0.061$ was established, thereby satisfying the expression (2).

Further, the thickness $D_1$ of the first lens 1 was 1.4696 mm; the thickness $D_2$ of the second lens 2 was 0.9660 mm; the thickness $D_3$ of the third lens 3 was 1.4600 mm, each of which satisfied the expression (3).

In addition, $D_s = 1.342$ was established, thereby satisfying the expression (4).

Further, $D_0 = 0.12$ was established, thereby satisfying the expression (5).

Figure 7:
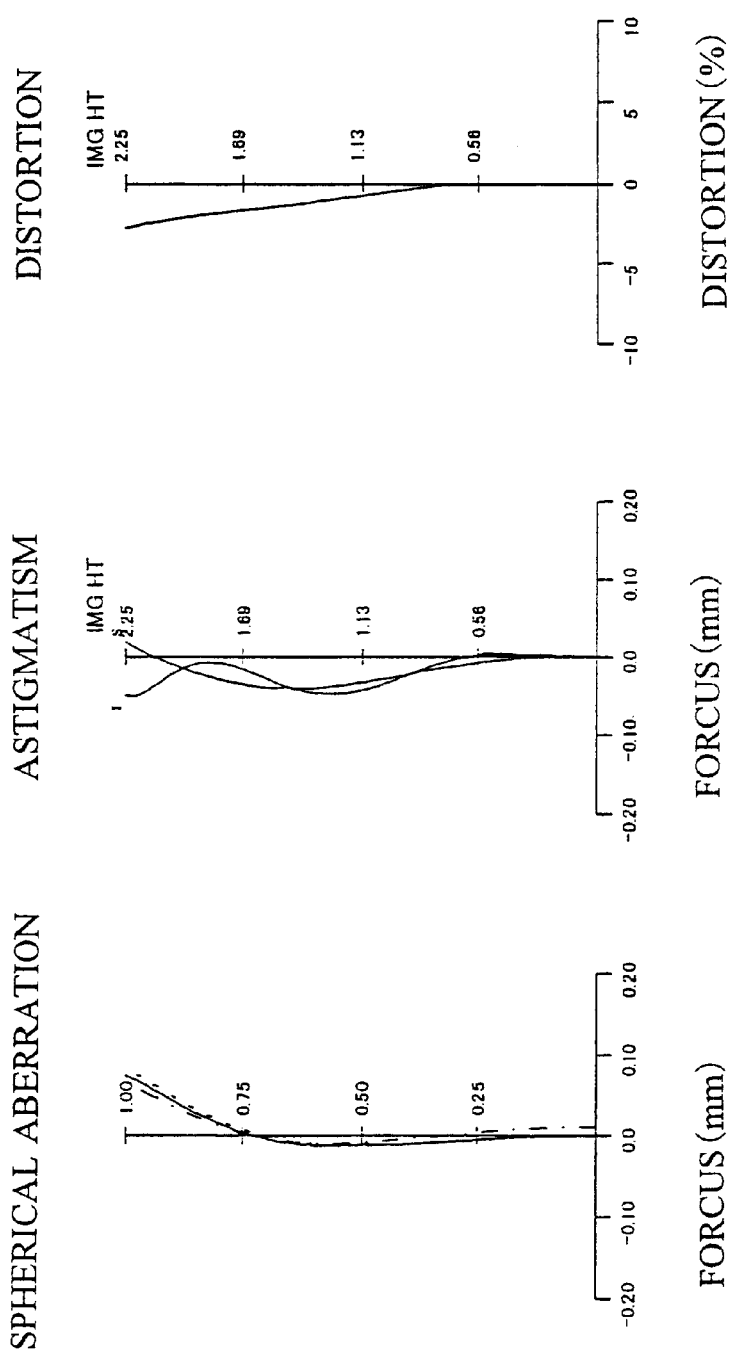
FIG. 7 is graphs showing the spherical aberration, the astigmatism and the distortion of the image pickup lens system shown in FIG. 6.
Figure 8:
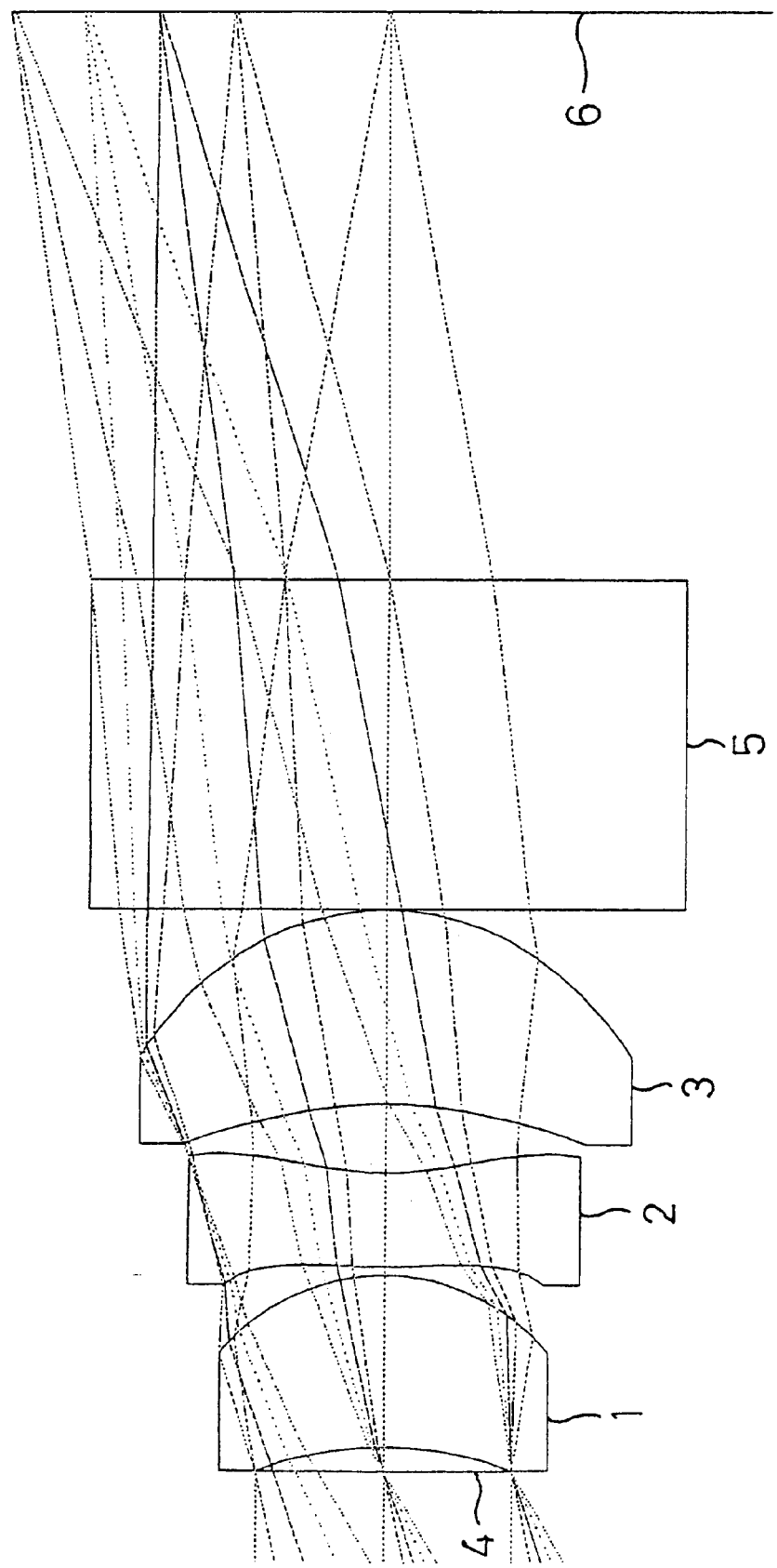
FIG. 8 is a schematic illustration showing Example 4 of an image pickup lens system according to the present invention.

The spherical aberration, the astigmatism and the distortion in the image pickup lens system of Example 3 are shown in FIG. 7.

It can be seen from this result that any of the spherical aberration, the astigmatism and the distortion assumes a satisfactory value and hence, sufficient optical characteristics can be provided.

Example 4

FIG. 4 shows Example 4 of the present invention, which is an image pickup lens system having the arrangement shown in FIG. 1. The image pickup lens system of Example 4 is set under the following conditions:

f1=4.21 mm; F=2.80; 2ω=60.0°; $f_1$=3.98 mm; $f_2$=−4.93 mm; $f_3$=4.91 mm; $f_{12}$=21.08 mm

| Face | Radius r of curvature | Distance d | Refractive index nd | Abbe number νd |
|---|---|---|---|---|
| (1) Diaphragm | 0.000 | 0.1500 | | |
| (2) First face of first lens | −2.051 | 1.0000 | 1.49 | 57.8 |
| (3) Second face of first lens | −1.165 | 0.0500 | | |
| (4) First face of second lens | 4.982 | 0.5500 | 1.62 | 24.0 |
| (5) Second face of second lens | 1.813 | 0.4000 | | |
| (6) First face of third lens | −2.652 | 1.1500 | 1.49 | 57.8 |

-continued

| | | | |
|---|---|---|---|
| (7) Second face of third lens | −1.449 | 0.0000 | |
| (8) First face of cover glass | 0.000 | 1.9500 | 1.52 |
| (9) Second face of cover glass | 0.000 | 3.3515 | |
| (10) CCD face | | | |

| | k | a | b |
|---|---|---|---|
| 2 | 4.589549e+000 | 1.103479e−001 | −7.527224e−002 |
| 3 | −2.220726e+000 | −1.264583e−001 | 4.640025e−002 |
| 4 | −3.138802e+001 | −1.992003e−001 | −4.300628e−003 |
| 5 | −5.158782e+000 | −1.287441e−001 | 2.462945e−002 |
| 6 | −9.566350e−001 | 5.079559e−002 | −3.786115e−002 |
| 7 | −5.800868e−001 | 4.369435e−003 | −1.439120e−002 |

| | c | d |
|---|---|---|
| 2 | 9.629993e−002 | 8.042673e−002 |
| 3 | −4.562130e−002 | −1.143194e−003 |
| 4 | −1.111646e−002 | −2.305504e−002 |
| 5 | −3.967208e−003 | 5.707421e−004 |
| 6 | 1.115883e−002 | −1.416765e−003 |
| 7 | 5.728262e−003 | −1.183067e−003 |

Under such conditions, $r_1/r_2 = 1.761$ was established, thereby satisfying the expression (1).

In addition, $r_4/r_3 = 0.364$ was established, thereby satisfying the expression (2).

Further, the thickness $D_1$ of the first lens 1 was 1.0000 the thickness $D_2$ of the second lens 2 was 0.5500 mm; the thickness $D_3$ of the third lens 3 was 1.1500 mm, each of which satisfied the expression (3).

In addition, $D_s = 1.666$ was established, thereby satisfying expression (4).

Further, $D_0 = 0.15$ was established, thereby satisfying the expression (5).

Figure 9:
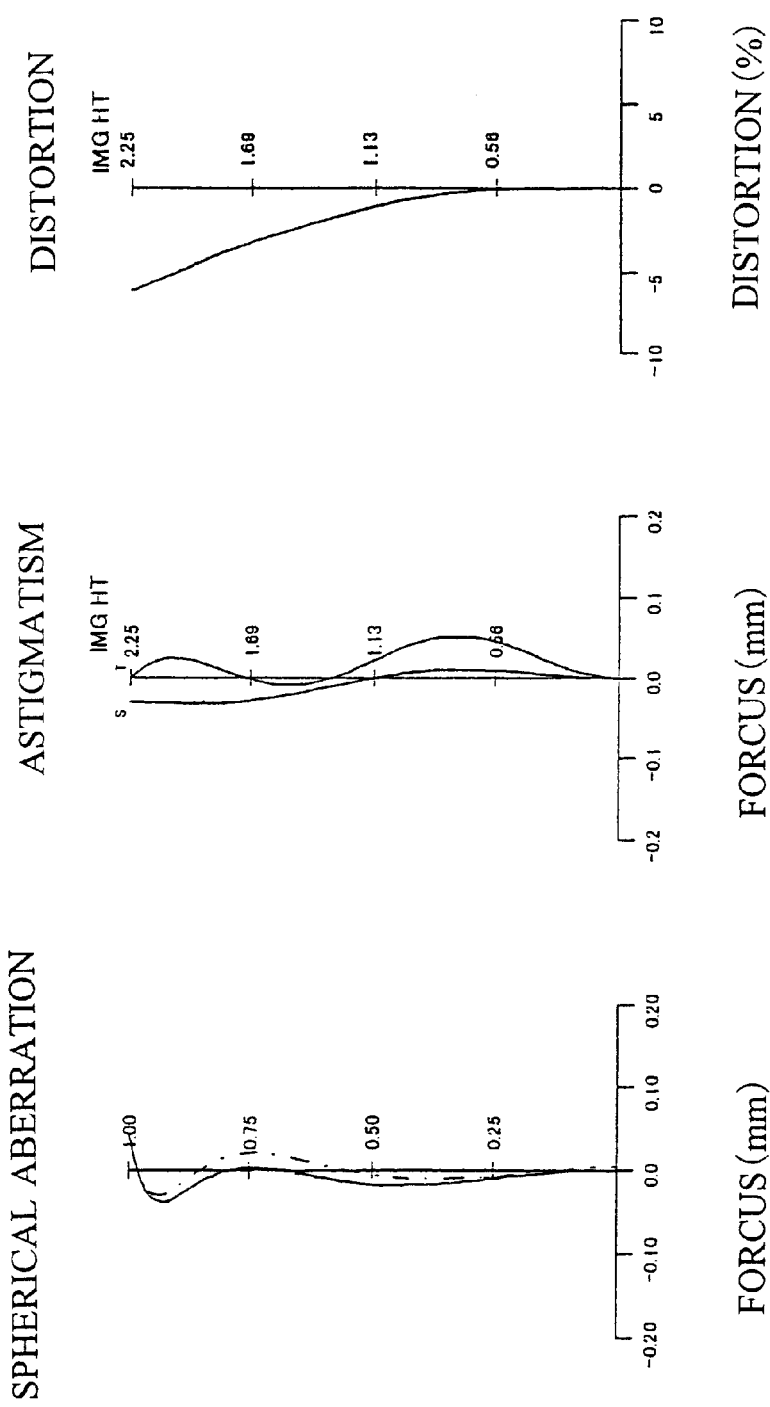
FIG. 9 is graphs showing the spherical aberration, the astigmatism and the distortion of the image pickup lens system shown in FIG. 8.

The spherical aberration, the astigmatism and the distortion in the image pickup lens system of Example 4 are shown in FIG. 9.

It can be seen from this result that any of the spherical aberration, the astigmatism and the distortion assumes a satisfactory value and hence, sufficient optical characteristics can be provided.

Example 5

Figure 10:
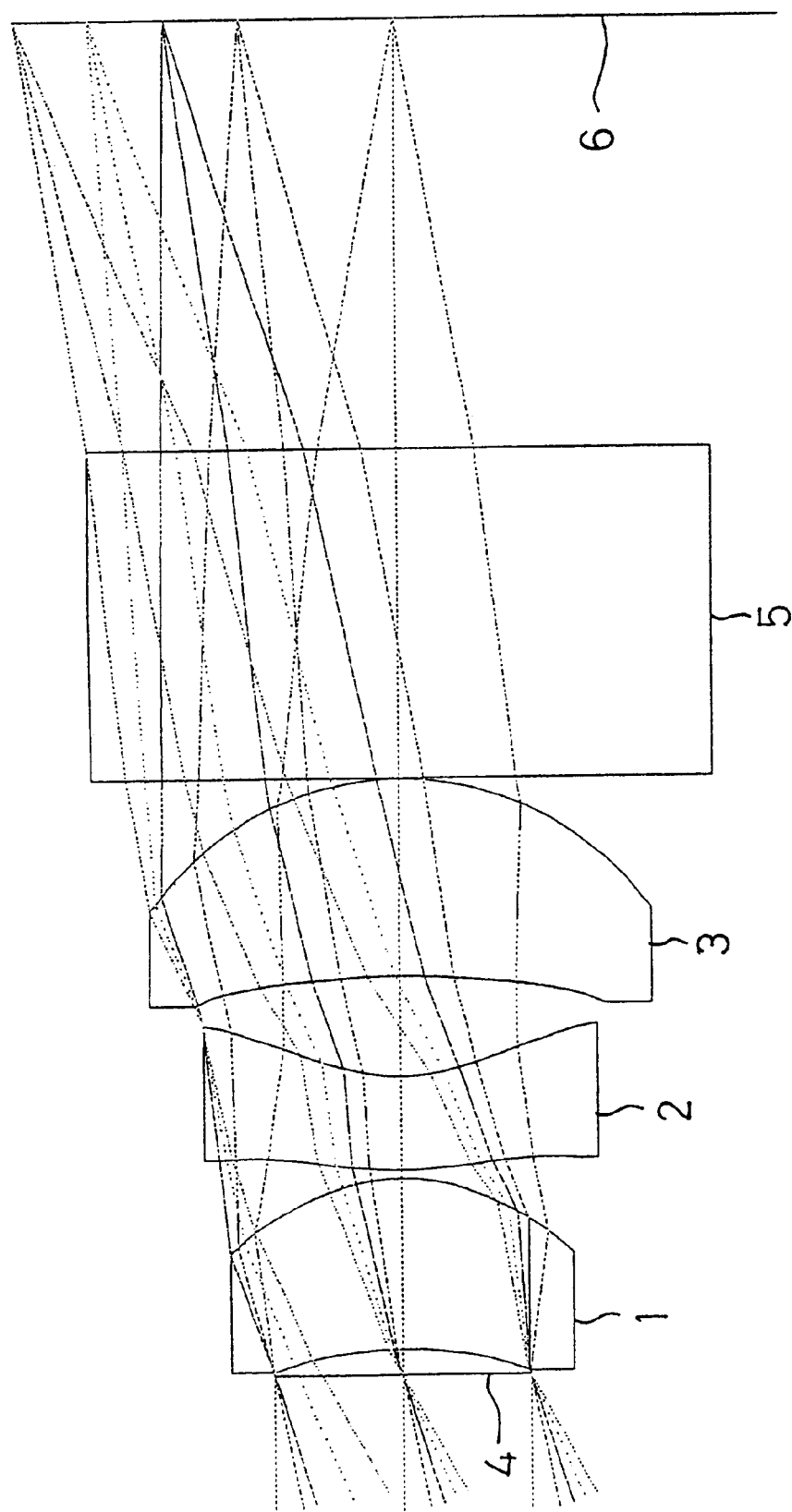
FIG. 10 is a schematic illustration showing Example 5 of an image pickup lens system according to the present invention.

FIG. 10 shows Example 5 of the present invention, which is an image pickup lens system having the arrangement shown in FIG. 1. The image pickup lens system of Example 5 is set under the following conditions:

f1=4.21 mm; F=2.80; 2ω=58.7°; $f_1$=3.27 mm; $f_2$=−3.55 mm; $f_3$=4.49 mm; $f_{12}$=19.00 mm

| Face | Radius r of curvature | Distance d | Refractive index nd | Abbe number νd |
|---|---|---|---|---|
| (1) Diaphragm | 0.000 | 0.1500 | | |
| (2) First face of first lens | −2.470 | 1.0000 | 1.49 | 57.8 |
| (3) Second face of first lens | −1.108 | 0.0500 | | |
| (4) First face of second lens | 2.333 | 0.5500 | 1.62 | 24.0 |
| (5) Second face of second lens | 1.030 | 0.5700 | | |

-continued

| | Radius r of curvature | Distance d | Refractive index nd | Abbe number vd |
|---|---|---|---|---|
| (6) First face of third lens | −5.923 | 1.1500 | 1.49 | 57.8 |
| (7) Second face of third lens | −1.718 | 0.0000 | | |
| (8) First face of cover glass | 0.000 | 1.9500 | 1.52 | |
| (9) Second face of cover glass | 0.000 | 2.4991 | | |
| (10) CCD face | | | | |

| | k | a | b |
|---|---|---|---|
| 2 | 5.929735e+000 | 5.751056e−002 | −7.249047e−002 |
| 3 | −2.36030e+000 | −4.969801e−002 | −2.462469e−002 |
| 4 | −1.538654e+001 | −5.238795e−002 | −3.970703e−002 |
| 5 | −3.993883e+000 | −6.020320e−002 | 1.161353e−004 |
| 6 | 0.000000e+000 | 1.781465e−002 | −8.658776e−003 |
| 7 | −5.831106e−001 | −3.554645e−003 | −9.588639e−005 |

| | c | d |
|---|---|---|
| 2 | 9.709219e−002 | 0.0000000e+000 |
| 3 | 1.712321e−003 | 0.0000000e+000 |
| 4 | 1.667543e−002 | 0.0000000e+000 |
| 5 | −2.332736e−004 | 0.0000000e+000 |
| 6 | −9.613677e−003 | 0.0000000e+000 |
| 7 | −2.569281e−003 | 0.0000000e+000 |

Under such conditions, $r_1/r_2 = 2.230$ was established, thereby satisfying the expression (1).

In addition, $r_4/r_3 = 0.441$ was established, thereby satisfying the expression (2).

Further, the thickness $D_1$ of the first lens 1 was 1.0000 mm; the thickness $D_2$ of the second lens 2 was 0.5500 mm; the thickness $D_3$ of the third lens 3 was 1.1500 mm, each of which satisfied the expression (3).

In addition, $D_s = 1.881$ was established, thereby satisfying the expression (4).

Further, $D_0 = 0.15$ was established, thereby satisfying the expression (5).

Figure 11:
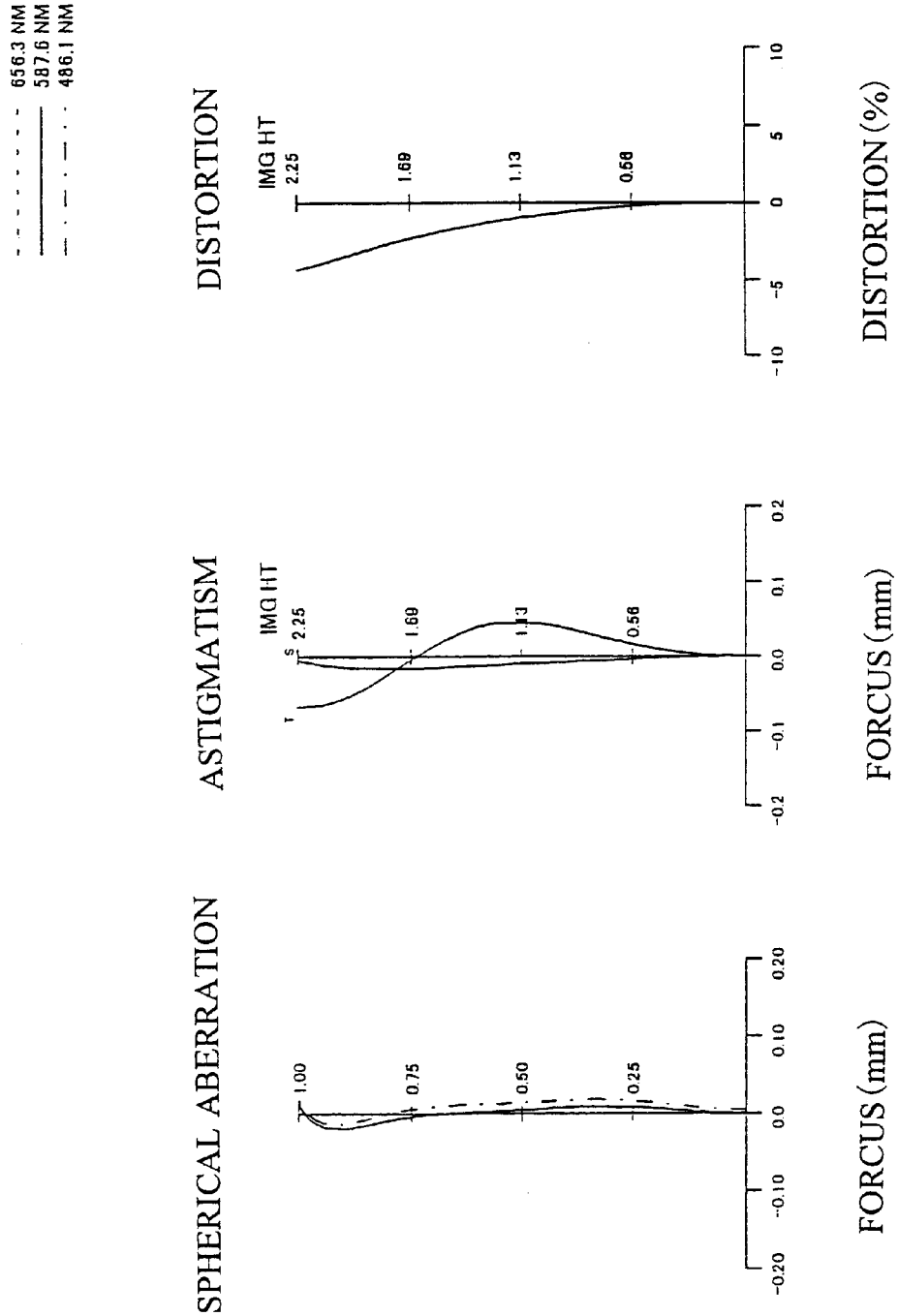
FIG. 11 is graphs showing the spherical aberration, the astigmatism and the distortion of the image pickup lens system shown in FIG. 10.

The spherical aberration, the astigmatism and the distortion in the image pickup lens system of Example 5 are shown in FIG. 11.

It can be seen from this result that any of the spherical aberration, the astigmatism and the distortion assumes a satisfactory value and hence, sufficient optical characteristics can be provided.

Example 6

Figure 12:
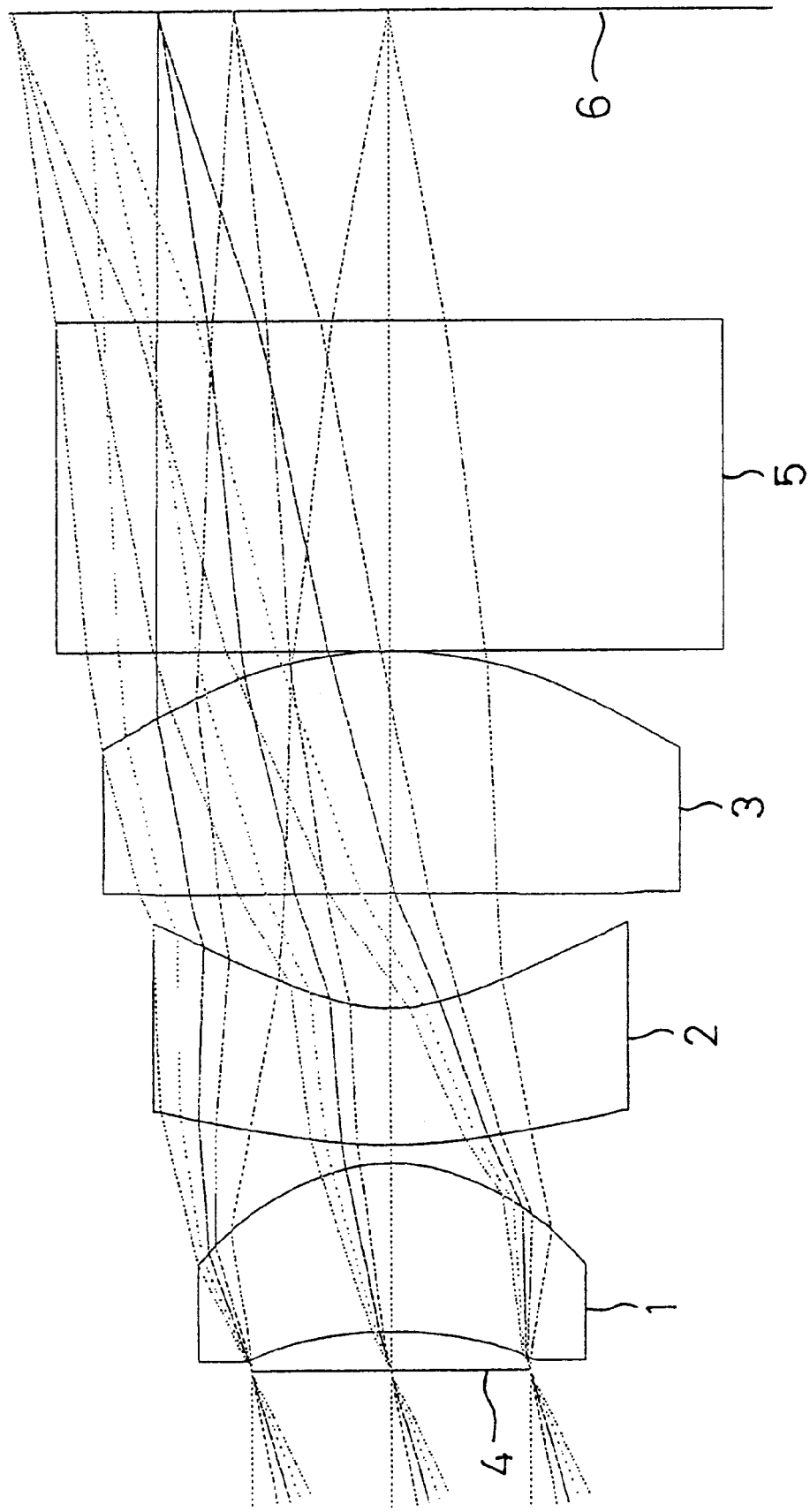
FIG. 12 is a schematic illustration showing Example 6 of an image pickup lens system according to the present invention.

FIG. 12 shows Example 6 of the present invention, which is an image pickup lens system having the arrangement shown in FIG. 1. The image pickup lens system of Example 6 is set under the following conditions: f1=4.60 mm; F=2.80; 2ω=51.8°; $f_1$=3.00 mm; $f_2$=−3.03 mm; $f_3$=4.80 mm; $f_{12}$=13.24 mm

| Face | Radius r of curvature | Distance d | Refractive index nd | Abbe number vd |
|---|---|---|---|---|
| (1) Diaphragm | 0.000 | 0.2300 | | |
| (2) First face of first lens | −2.852 | 1.0000 | 1.49 | 57.8 |
| (3) Second face of first lens | −1.087 | 0.1000 | | |
| (4) First face of second lens | 2.953 | 0.8000 | 1.62 | 24.0 |

-continued

| | Radius r of curvature | Distance d | Refractive index nd | Abbe number vd |
|---|---|---|---|---|
| (5) Second face of second lens | 1.029 | 0.6800 | | |
| (6) First face of third lens | 166.826 | 1.4600 | 1.49 | 57.8 |
| (7) Second face of third lens | −2.399 | 0.0000 | | |
| (8) First face of cover glass | 0.000 | 1.9500 | 1.52 | |
| (9) Second face of cover glass | 0.000 | 1.8332 | | |
| (10) CCD face | | | | |

| | k | a | b |
|---|---|---|---|
| 2 | 5.929735e+000 | −9.997860e−003 | −2.925155e−002 |
| 3 | −2.36030e+000 | −5.814863e−002 | −1.559045e−002 |
| 4 | −1.538654e+001 | −3.498282e−003 | −6.414351e−003 |
| 5 | −3.993883e+000 | −8.261720e−003 | −2.446294e−003 |
| 6 | 0.000000e+000 | −1.754035e−002 | 8.255340e−003 |
| 7 | −5.831106e−001 | 2.566225e−003 | −2.035686e−003 |

| | c | D |
|---|---|---|
| 2 | 1.235172e−002 | 0.0000000e+000 |
| 3 | −1.938904e−003 | 0.0000000e+000 |
| 4 | 3.725098e−003 | 0.0000000e+000 |
| 5 | 2.020822e−003 | 0.0000000e+000 |
| 6 | −7.942635e−005 | 0.0000000e+000 |
| 7 | 1.209266e−003 | 0.0000000e+000 |

Under such conditions, $r_1/r_2 = 2.623$ was established, thereby satisfying the expression (1).

In addition, $r_4/r_3$ 0.348 was established, thereby satisfying the expression (2).

Further, the thickness $D_1$ of the first lens 1 was 1.0000 the thickness $D_2$ of the second lens 2 was 0.8000 mm; the thickness $D_3$ of the third lens 3 was 1.4600 mm, each of which satisfied the expression (3).

In addition, $D_s = 2.274$ was established, thereby satisfying the expression (4).

Further, $D_0 = 0.23$ was established, thereby satisfying the expression (5).

Figure 13:
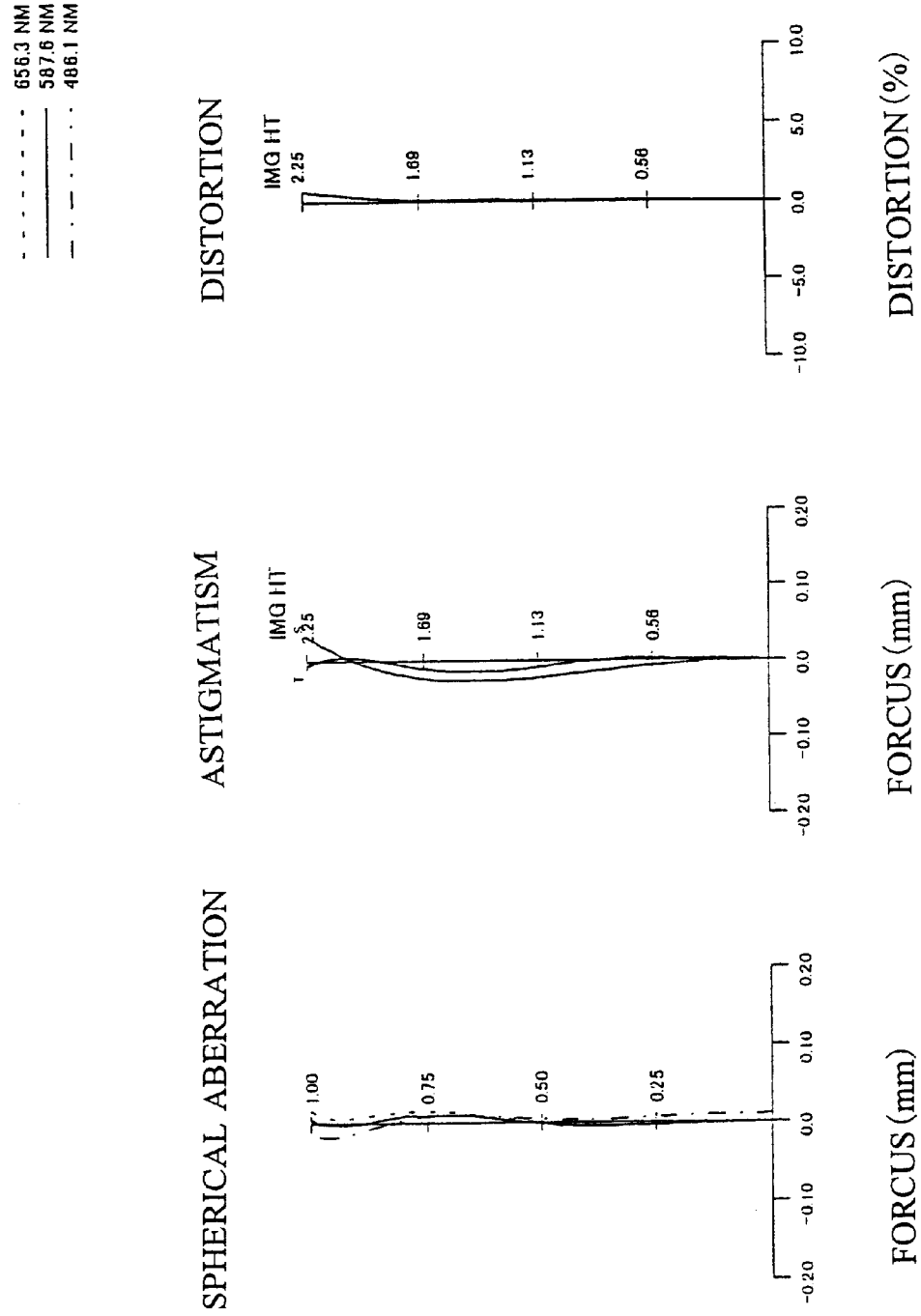
FIG. 13 is graphs showing the spherical aberration, the astigmatism and the distortion of the image pickup lens system shown in FIG. 12.

The spherical aberration, the astigmatism and the distortion in the image pickup lens system of Example 6 are shown in FIG. 13.

It can be seen from this result that any of the spherical aberration, the astigmatism and the distortion assumes a satisfactory value and hence, sufficient optical characteristics can be provided.

Example 7

Figure 14:
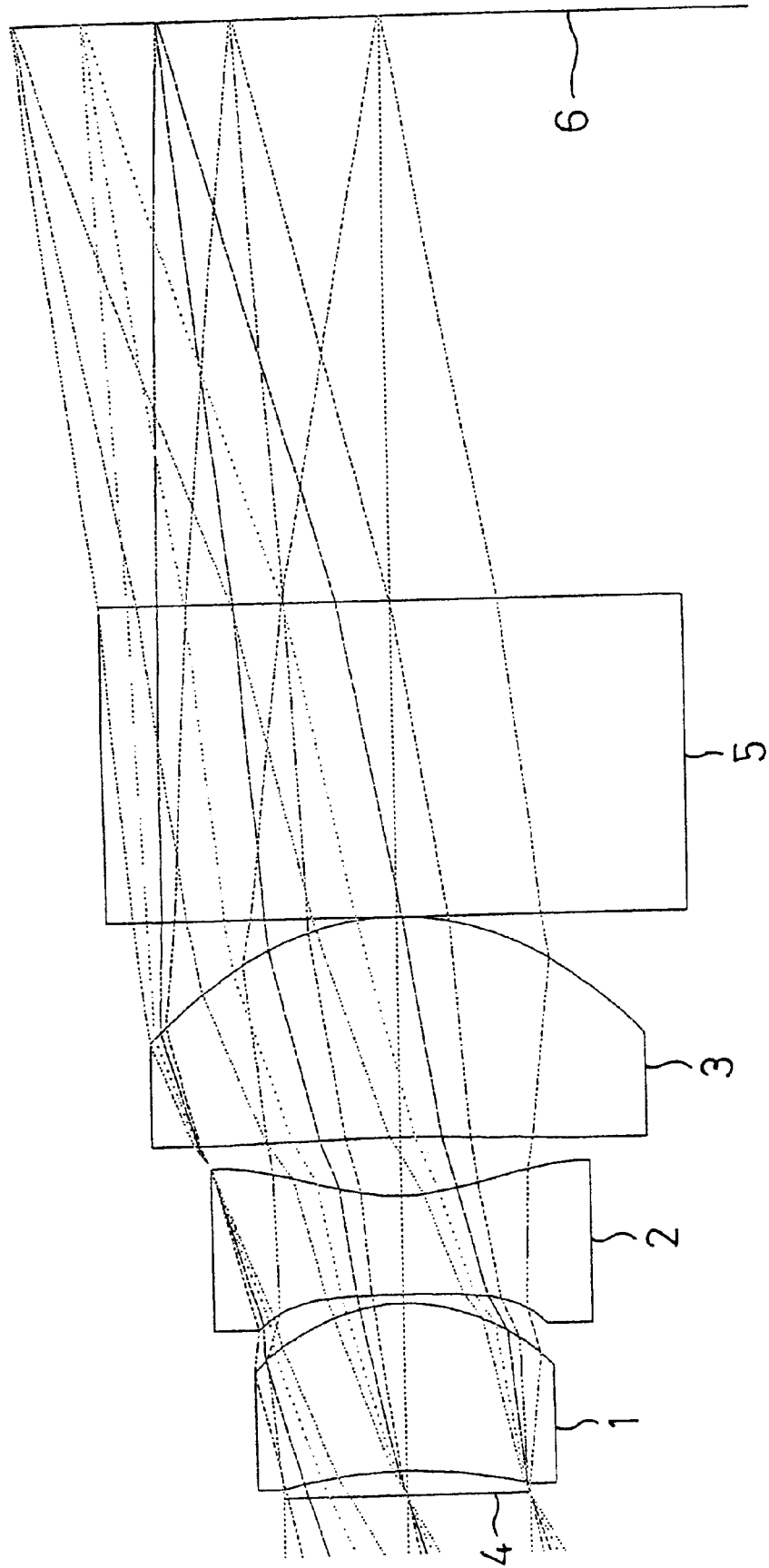
FIG. 14 is a schematic illustration showing Example 7 of an image pickup lens system according to the present invention.

FIG. 14 shows Example 7 of the present invention, which is an image pickup lens system having the arrangement shown in FIG. 1. The image pickup lens system of Example 7 is set under the following conditions:

f1=4.21 mm; F=2.80; 2ω=59.3°; $f_1$=3.22 mm; $f_2$=−2.24 mm; $f_3$=3.13 mm; f1$_2$=−8.04 mm

| Face | Radius r of curvature | Distance d | Refractive index nd | Abbe number vd |
|---|---|---|---|---|
| (1) Diaphragm | 0.000 | 0.1500 | | |
| (2) First face of first lens | −2.979 | 1.0000 | 1.49 | 57.8 |
| (3) Second face of first lens | −1.153 | 0.0500 | | |

-continued

| | | | | |
|---|---|---|---|---|
| (4) First face of second lens | 65.072 | 0.6000 | 1.59 | 30.0 |
| (5) Second face of second lens | 1.283 | 0.3500 | | |
| (6) First face of third lens | −14.298 | 1.3500 | 1.59 | 61.3 |
| (7) Second face of third lens | −1.690 | 0.0000 | | |
| (8) First face of cover glass | 0.000 | 1.9500 | 1.52 | |
| (9) Second face of cover glass | 0.000 | 3.5888 | | |
| (10) CCD face | | | | |

| | k | a | b |
|---|---|---|---|
| 2 | 1.171866e+001 | 1.225985e−001 | −1.447614e−001 |
| 3 | −3.436575e+000 | −1.147218e−001 | −2.605932e−002 |
| 4 | −2.584875e+005 | −2.444967e−001 | −1.057055e−001 |
| 5 | −5.990517e+000 | −1.093009e−001 | 3.616028e−002 |
| 6 | 4.577535e+001 | 2.217574e−002 | −2.041625e−002 |
| 7 | −4.955774e−001 | −2.062264e−003 | 2.475431e−003 |

| | c | d |
|---|---|---|
| 2 | 2.211246e−001 | 6.438260e−003 |
| 3 | 1.055872e−002 | −3.245510e−002 |
| 4 | 1.572570e−001 | −1.616840e−002 |
| 5 | −3.995775e−003 | −2.963840e−003 |
| 6 | 1.420966e−002 | −3.735690e−003 |
| 7 | −3.298729e−003 | 1.483400e−003 |

Under such conditions, $r_1/r_2=2.584$ was established, thereby satisfying the expression (1).

In addition, $r_4/r_3$ 0.020 was established, thereby the expression (2).

Further, the thickness $D_1$ of the first lens 1 was 1.0000 thickness $D_2$ of the second lens 2 was 0. 6000 mm; the thickness $D_3$ of the third lens 3 was 1.3500 mm, each of which satisfied the expression (3).

In addition, $D_s=1.407$ was established, thereby satisfying the expression (4).

Further, $D_0=0.15$ was established, thereby satisfying the expression (5).

Figure 15:
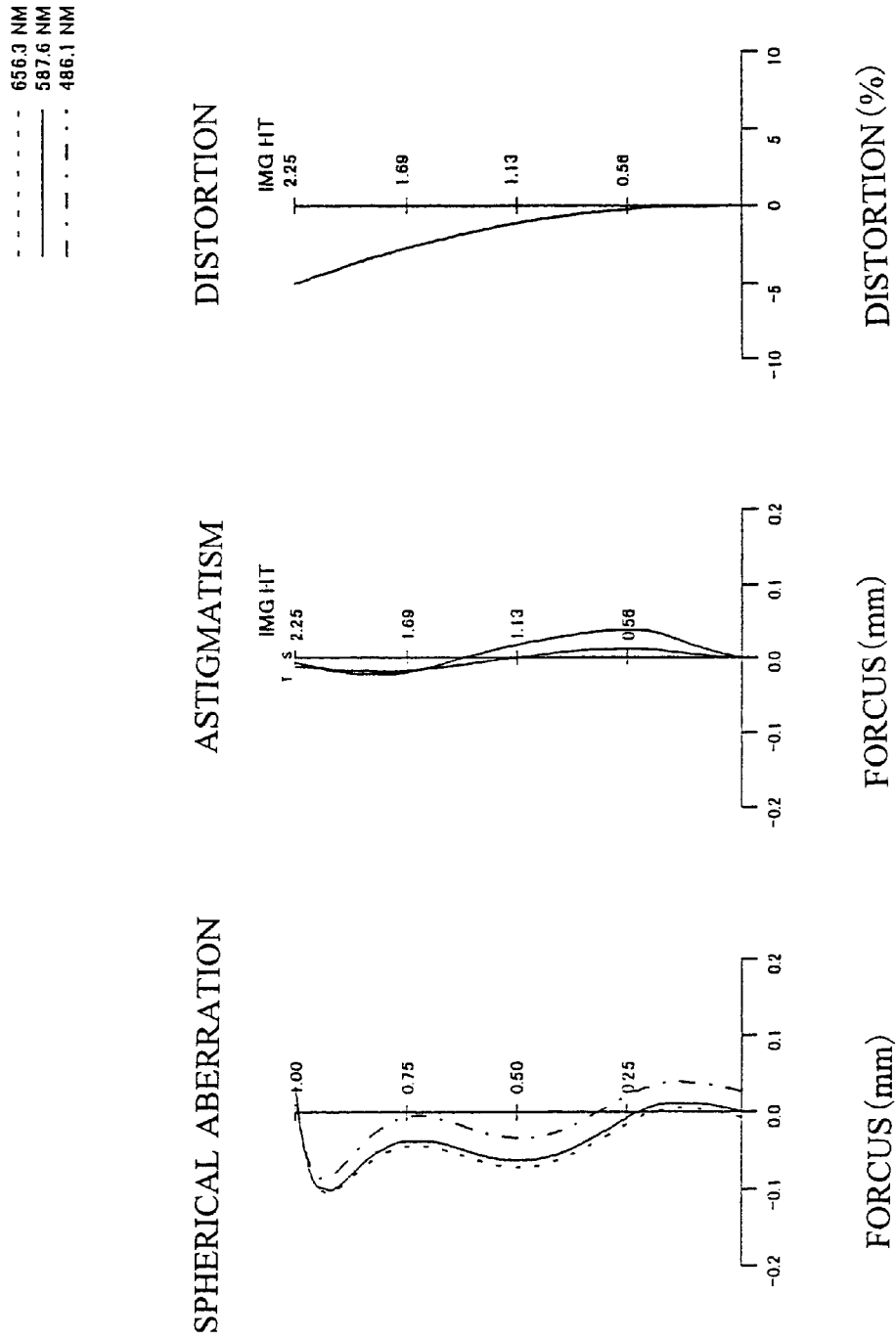
FIG. 15 is graphs showing the spherical aberration, the astigmatism and the distortion of the image pickup lens system shown in FIG. 14.

The spherical aberration, the astigmatism and the distortion the image pickup lens system of Example 7 are shown in FIG. 15.

It can be seen from this result that any of the spherical aberration, the astigmatism and the distortion assumes a satisfactory value and hence, sufficient optical characteristics can be provided.

Although the embodiments of the present invention have been described in detail, it will be understood that the present invention is not limited to the above-described embodiments, and various modifications in design may be made without departing from the spirit and scope of the invention defined in claims.

What is claimed is:

1. An image pickup lens system comprising a diaphragm, a first lens which has a convex face formed on the side of an image surface in the vicinity of an optical axis and which has a positive power and radii of curvature at a center, whose signs are not opposite from each other, a second lens which has a convex face formed on the side of an object in the vicinity of the optical axis and which has a negative power and radii of curvature at a center, whose signs are not opposite from each other, and a third lens which has a convex face formed on the side of the image surface in the vicinity of the optical axis and which has a positive power, said diaphragm and said first, second and third lenses being disposed sequentially from the side of the object, the first face of at least said second lens being formed into an aspherical shape.

2. An image pickup lens system according to claim 1, wherein said first lens satisfies the following expression:

$$r_1 \leq 1.5 \times r_2$$

wherein $r_1$ is a radius of curvature at the center of the first face of said first lens adjacent the object, and $r_2$ is a radius of curvature at the center of said second face of the first lens adjacent the image surface.

3. An image pickup lens system according to claim 1, wherein said second lens satisfies the following expression:

$$0.45 \times r_3 \geq r_4$$

wherein $r_3$ is a radius of curvature at the center of the first face of said second lens adjacent the object, and $r_4$ is a radius of curvature at the center of the second face of said second lens adjacent the image surface.

4. An image pickup lens system according to claim 2, wherein said second lens satisfies the following expression:

$$0.45 \times r_3 \geq r_4$$

wherein $r_3$ is a radius of curvature at the center of the first face of said second lens adjacent the object, and $r_4$ is a radius of curvature at the center of the second face of said second lens adjacent the image surface.

* * * * *